United States Patent [19]

Gellert

[11] Patent Number: 6,009,616
[45] Date of Patent: Jan. 4, 2000

[54] METHOD OF MAKING AN INJECTION MOLDING NOZZLE WITH TIP INSERT

[76] Inventor: Jobst Ulrich Gellert, 7A Prince St., Georgetown, Ontario, Canada, L7G 2X1

[21] Appl. No.: 09/195,095

[22] Filed: Nov. 18, 1998

[30] Foreign Application Priority Data

Oct. 16, 1998 [CA] Canada ..................................... 2250599

[51] Int. Cl.$^7$ ...................................................... H05B 3/00
[52] U.S. Cl. ............................ 29/611; 219/540; 219/541; 425/549
[58] Field of Search ............................... 29/611, 876, 845, 29/8; 425/549; 219/421, 424, 541

[56] References Cited

U.S. PATENT DOCUMENTS

| | | |
|---|---|---|
| 4,557,685 | 12/1985 | Gellert . |
| 4,768,283 | 9/1988 | Gellert . |
| 5,235,737 | 8/1993 | Gellert ..................................... 29/611 |
| 5,437,093 | 8/1995 | Gellert . |
| 5,494,433 | 2/1996 | Gellert . |
| 5,507,635 | 4/1996 | Gellert ..................................... 425/190 |
| 5,507,636 | 4/1996 | Gellert ..................................... 425/549 |
| 5,518,393 | 5/1996 | Gessner ..................................... 425/549 |
| 5,569,475 | 10/1996 | Adas et al. .............................. 425/549 |
| 5,591,465 | 1/1997 | Babin ..................................... 425/549 |
| 5,614,233 | 3/1997 | Gellert ..................................... 425/549 |
| 5,658,604 | 8/1997 | Gellert et al. . |
| 5,704,113 | 1/1998 | Mak ......................................... 29/611 |
| 5,795,599 | 8/1998 | Gellert ..................................... 425/549 |
| 5,820,899 | 10/1998 | Gellert et al. ........................... 425/549 |
| 5,851,565 | 12/1998 | Garver et al. ........................... 425/109 |

OTHER PUBLICATIONS

Canadian Patent Application Number 2,082,700 which was laid open May 13, 1994 entitled "Injection Molding Torpedo with Diagonal Melt Bore".

*Primary Examiner*—Lee Young
*Assistant Examiner*—Sean Smith
*Attorney, Agent, or Firm*—Dalesman & Company

[57] ABSTRACT

A method of making a heated injection molding nozzle with an integral tip insert. First, an inner portion, an outer collar portion, and an electrical heating element are made and integrally brazed together in a vacuum furnace using a first nickel alloy brazing material. Then a tip insert is made having a desired configuration and seated in the front end of the inner portion and a second nickel alloy brazing material is applied around it. The second brazing material has a melting temperature which is substantially below that of the first brazing material. The tip insert is then integrally brazed in place by heating them to a temperature above the melting temperature of the second brazing material and below the melting temperature of the first brazing material. In addition to not affecting the metallurgical bonding between the other components, this allows the tip insert to be easily removed for replacement by again heating the nozzle to this same temperature.

14 Claims, 5 Drawing Sheets

METHOD OF MAKING AN INJECTION MOLDING NOZZLE WITH TIP INSERT

BACKGROUND OF THE INVENTION

This invention relates generally to injection molding and more particularly to a method of making a heated injection molding nozzle with a tip insert.

As seen in the applicant's U.S. Pat. No. 4,557,685 which issued Dec. 10, 1985 and U.S. Pat. No. 4,768,283 which issued Sep. 6, 1988, injection molding nozzles having a tip aligned with the gate to provide hot tip molding are well known. Apparatus having a hot tip provided by a torpedo seated in the front end of a nozzle is also known. For instance, the applicant's Canadian Patent Application Number 2,082,700 which was laid open May 13, 1994 shows a torpedo having a tip held in place by a nozzle seal which slides into a seat in the front end of the nozzle. U.S. Pat. No. 5,658,604 to Gellert et al. which issued Aug. 19, 1997 similarly shows a torpedo with a tip which is held in place by a nozzle seal which is screwed into a seat in the front end of the nozzle. As seen in the applicant's U.S. Pat. No. 5,494,433 which issued Feb. 27, 1996, it is also known to have the tip provided by a side gate seal which screws into the nozzle.

As seen in U.S. Pat. No. 5,704,113 to Mold-Masters which issued Jan. 6, 1998, a method of making a nozzle wherein an inner portion, an outer collar portion and an electrical heating element are integrally brazed together is also known. The applicant's U.S. Pat. No. 5,437,093 which issued Aug. 1, 1995, shows a method wherein an injection molding nozzle is made by first brazing an inner core, an outer collar portion and an outer sleeve together by heating to a temperature above a first melting temperature and then casting an electrical heating element into the space between them by heating to a temperature above a second lower melting temperature.

The previous apparatus and methods have the disadvantage that the portion providing the tip is either screwed or pressure fitted into place and therefore does not provide optimal heat transfer.

SUMMARY OF THE INVENTION

Accordingly, it is an object of the present invention to at least partially overcome the disadvantages of the prior art by providing a method of making an integral injection molding heating nozzle by integrally brazing a tip insert into a seat in the front end of the inner portion of the nozzle.

To this end, in one of its aspects, the invention provides a method of making an integral heated injection molding nozzle comprising the following steps. Making an elongated inner portion having a rear end, a front end, a melt bore extending therethrough from the rear end to the front end, and a general cylindrical outer surface with a spiral groove extending therearound. Making an outer collar portion to fit around the inner portion adjacent the rear end of the inner portion, the outer collar portion having a radial opening therethrough. Winding an electrical heating element into the spiral groove extending around the outer surface of the inner portion and mounting the outer collar portion in place around the inner portion with a terminal portion of the heating element extending outwardly through the radial opening through the outer collar portion. Closing in the radial opening around the at least one terminal portion. Applying a first brazing material having a predetermined melting temperature between the inner portion and the surrounding outer collar portion. Integrally brazing the inner portion, the outer collar portion, and the electrical heating element together by heating them in a substantially oxygen free atmosphere in a vacuum furnace to a temperature above the melting temperature of the first brazing material. Machining the integral nozzle to provide a desired outer shape and finish. Making a seat extending around the melt bore at the front end of the inner portion of the nozzle. Making a tip insert having a rear end, a rear portion extending forwardly from the rear end, a tip portion extending to forwardly from the rear portion, and a melt bore extending forwardly therethrough from the rear end. The rear portion is made to fit in the seat at the front end of the inner portion of the nozzle with the melt bore through the tip insert extending from the melt bore through the inner portion of the nozzle. Inserting the tip insert into the matching seat at the front end of the inner portion of the nozzle. Then applying a second brazing material where the tip insert and the inner portion of the nozzle join, the second brazing material having a predetermined melting temperature substantially lower than the melting temperature of the first brazing material. Finally, integrally brazing the tip insert in place in the inner portion by heating them to a temperature above the melting temperature of the second brazing material and below the melting temperature of the first brazing material.

Further objects and advantages of the invention will appear from the following description taken together with the accompanying drawings.

DETAILED DESCRIPTION OF THE INVENTION

Figure 1:
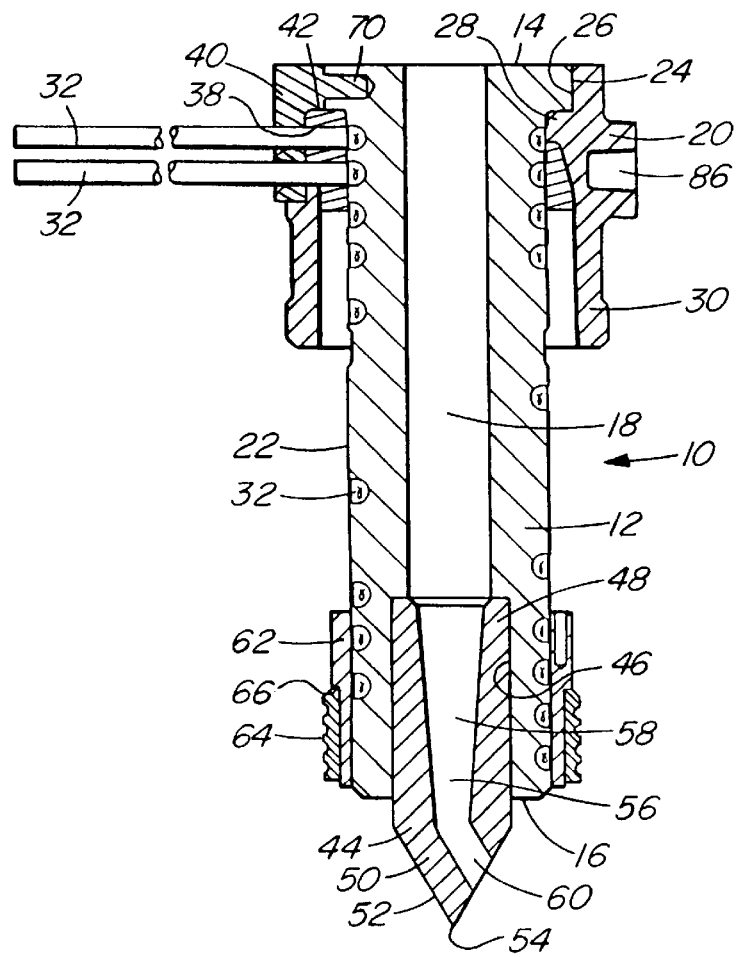
FIG. 1 is a sectional view of an integral heated injection molding nozzle made according to a first embodiment the invention.
Figure 2:
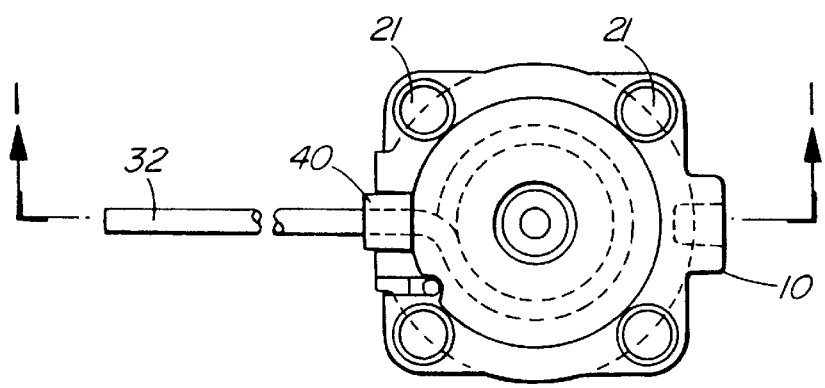
FIG. 2 is a bottom view of the heated injection molding nozzle seen in FIG. 1.

Reference is first made to FIGS. 1 and 2 which show an integral heated injection molding nozzle 10 made by a first embodiment of the present invention. The nozzle 10 has an elongated inner portion 12 with a rear end 14 and a front end 16. The nozzle 10 is seated in a mold (not shown) and has a central melt bore 18 extending through the inner portion 12 to convey melt to a gate (not shown). The nozzle 10 also has an integral outer collar portion 20 which fits around the elongated inner portion 12 adjacent its rear end 14. While the outer collar portion 20 is normally made of H13 hot work tool steel, the inner portion 12 may be made of a different material such as stainless steel or a beryllium nickel alloy having different thermal characteristics to provide the nozzle 10 with the thermal balance required for different materials being molded. In this embodiment, the outer collar portion 20 is made with threaded bolt holes 21 to receive bolts (not shown) to secure it to a melt distribution manifold.

The inner portion 12 of the nozzle 10 has a generally cylindrical outer surface 22 with an outwardly extending head 24 at its rear end 14. The head 24 fits tightly in a seat 26 in the outer collar portion 20. The outer collar portion 20 has a circular inner flange 28 against which the head 24 of the inner portion 12 abuts. The outer collar portion 20 also has a cylindrical skirt 30 which extends forwardly around but spaced from the outer surface 22 of the inner portion 12 to locate the nozzle 10 in the mold (not shown). An integral electrical heating element 32 extends in a spiral groove 34 extending around the outer surface 22 of the inner portion 12 of the nozzle 10. The heating element 32 has terminal portions 36 which in this embodiment extends outwardly through holes 38 through a terminal locating and sealing key 40 received in a slot 42 in the outer collar portion 20 of the nozzle 10.

The nozzle 10 also has a tip insert 44 brazed into a seat 46 at the front end 16 of the inner portion 12 of the nozzle 10. The tip inserts 44 are made according to this embodiment of the invention of a suitable material such as a tungsten carbide alloy have a rear portion 48 and one tip portion 50 with a conical outer surface 52 extending centrally forward to a tip 54. Each tip insert 44 also has a tapered melt bore 56 extending forwardly from its rear end 58 through the rear portion 48 and the tip portion 50. As can be seen, in this embodiment the melt bore 56 through the tip insert 44 has a rear portion 58 aligned with the central melt bore 18 through the inner portion 12 of the nozzle 10 and a front portion 60 extending diagonally outward to the outer conical surface 52. The rear portion 48 of the tip insert 44 and the matching seat 46 at the front end 16 of the inner portion 12 made according to this embodiment of the invention are cylindrical. However, in other embodiments of the invention they can have other suitable matching shapes.

The integral heated nozzle 10 also has a locating and sealing ring stopper sleeve 62 integrally mounted around the cylindrical outer surface 22 of the inner portion 12. This allows a ribbed locating and sealing ring 64 to be removably mounted to abut against a forwardly facing outer shoulder 66 extending around the locating and sealing ring stopper sleeve 62.

Figure 3:
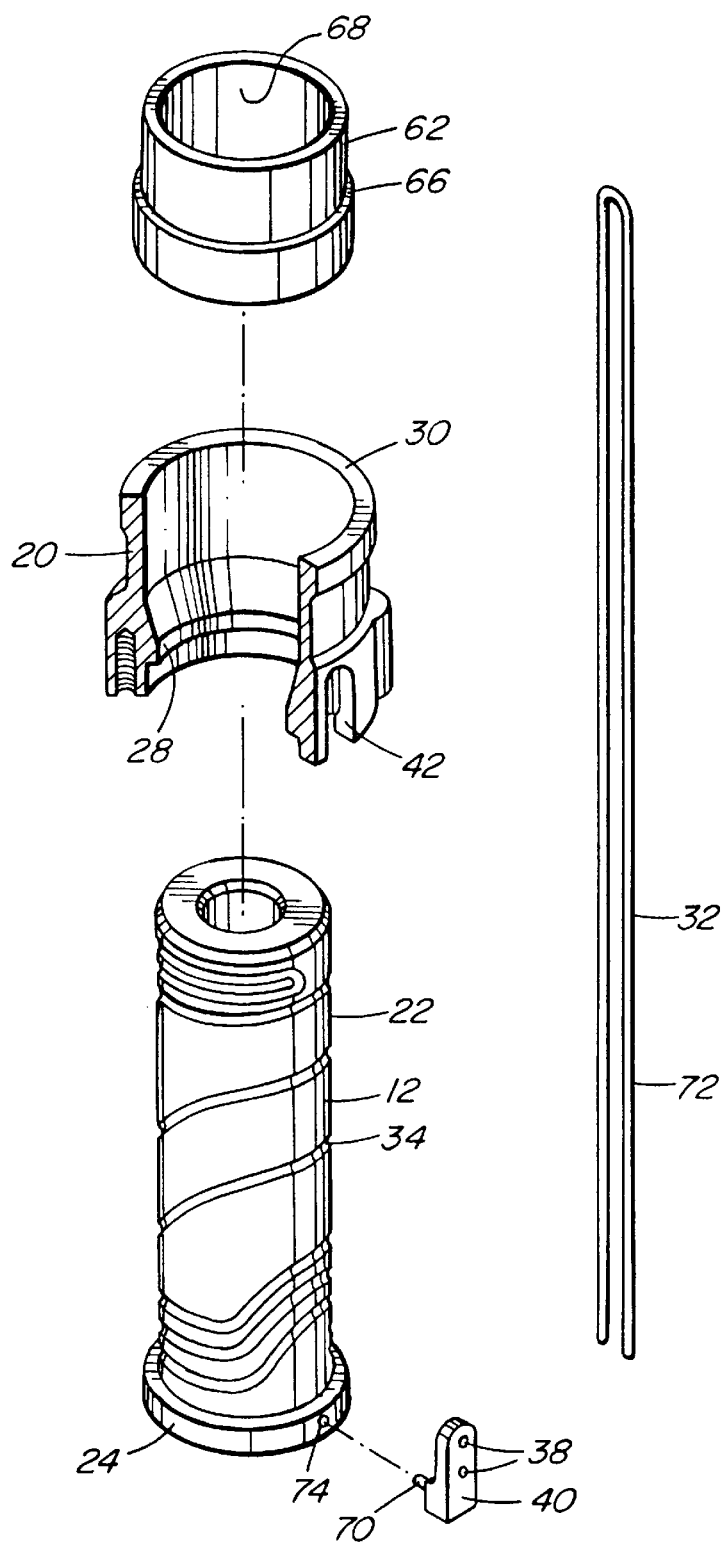
FIG. 3 is an exploded isometric view of the components that are brazed together in the first brazing step according to the first embodiment of the invention.
Figure 4:
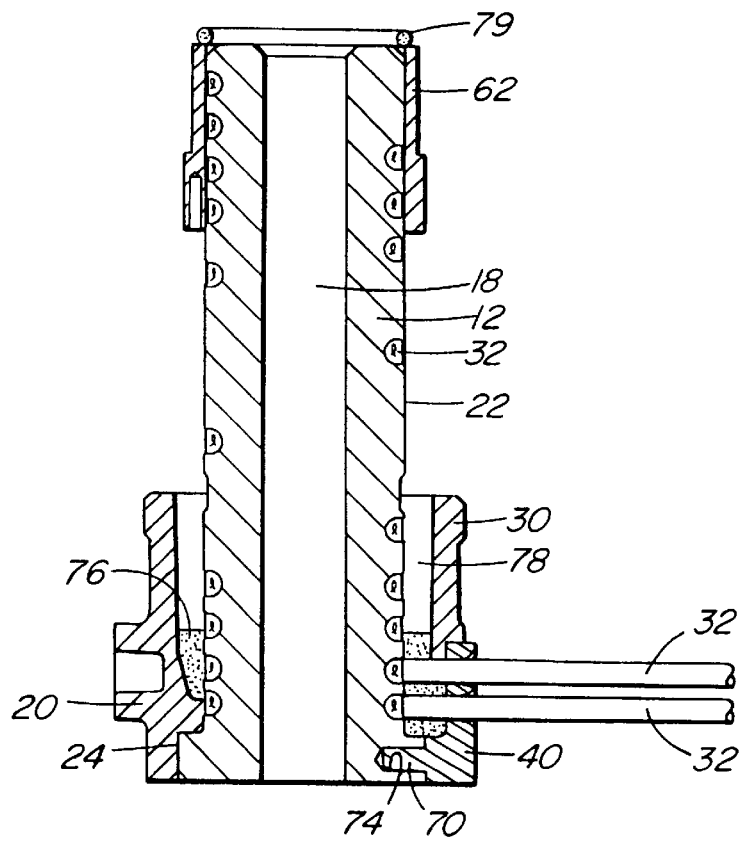
FIG. 4 is a sectional view showing the same components assembled together.

Reference will now also be made to FIGS. 3–6 to describe a method of making the integral heated injection molding nozzle 10 according to one embodiment of the invention. Firstly, the components of the integral heated nozzle 10 are made as shown in FIG. 3. The inner portion 12 of the nozzle 10 is made of a suitable material such as H13 tool steel to have the generally cylindrical outer surface 22 with the spiral groove 34 in it and the outwardly extending head 24 at its rear end 14. The inner portion 12 is made by conventional machining or by metal injection molding. The outer collar portion 20 is made with the inner flange 28 which fits around the inner portion 12 and has the slot 42 providing a radial opening therethrough. The outer collar portion 20 is similarly to made by conventional machining or by metal injection molding of a suitable material such as H13 tool steel, stainless steel or a beryllium nickel alloy.

In this embodiment, the locating and sealing ring stopper sleeve 62 is made similarly of a suitable material such as H13 tool steel. It is made with the forwardly facing outer shoulder 66 and a cylindrical inner surface 68 which fits over the cylindrical outer surface 22 of the inner portion 12. The terminal locating and sealing key 40 having the holes 38 through it and a pin portion 70 extending inwardly therefrom is made similarly of a suitable material such as H13 tool steel to fit in the slot 42 in the outer collar portion 20. The heating element 32 is made in a conventional manner with insulative compacted magnesium oxide powder extending around a central resistance wire in an outer stainless steel casing 72.

Figures 6, 7, 8:
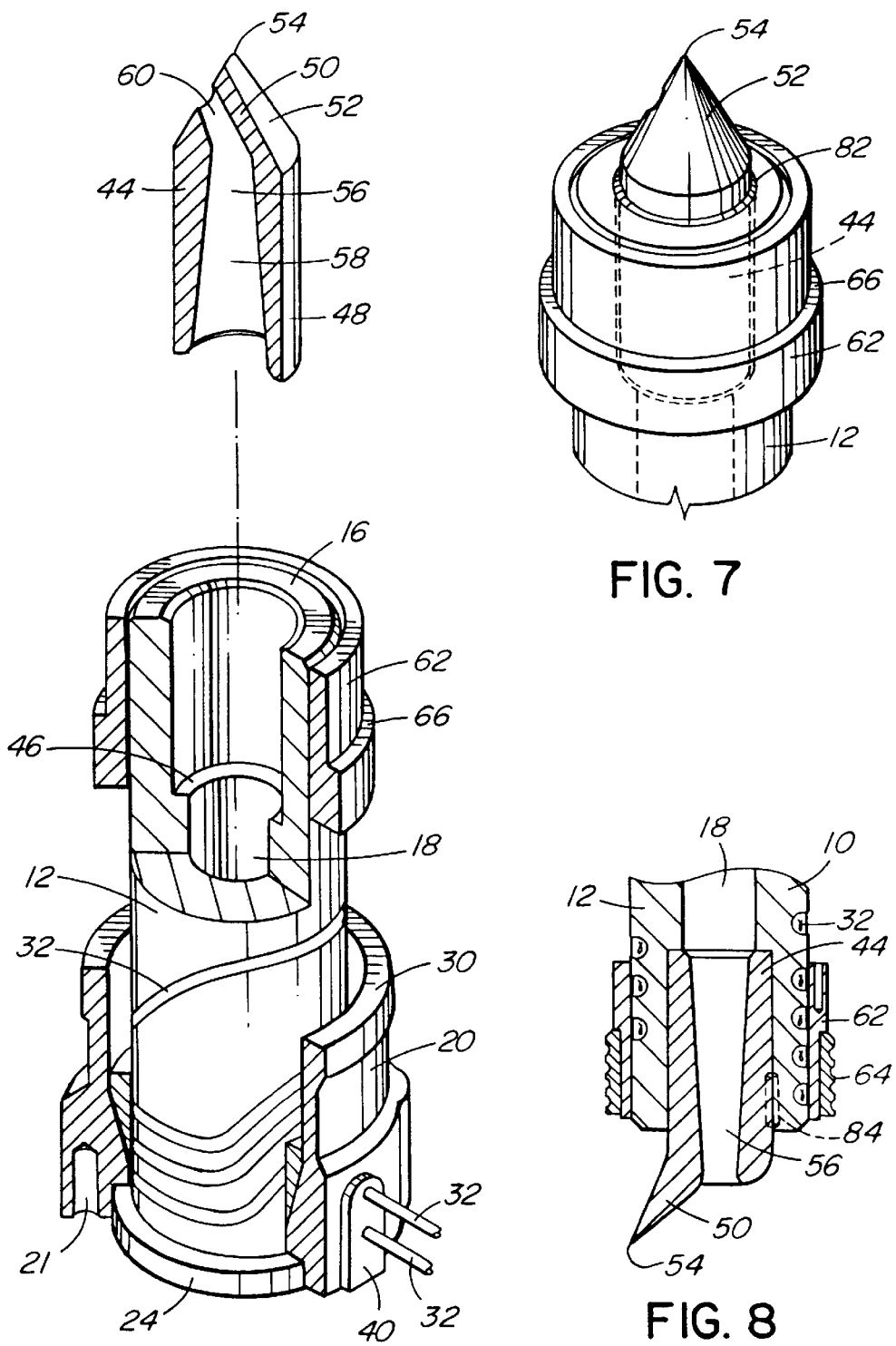
FIG. 6 is an isometric view showing a tip insert in position to be inserted into a seat in the front end of the nozzle according to the first embodiment of the invention.
FIG. 7 is an isometric view showing the tip insert seated in the front end of the nozzle.
FIG. 8 is a sectional view showing a nozzle made according to another embodiment of the invention having a tip with a single angled tip portion.

As best seen in FIG. 6, the tip insert 44 is made by machining it of a suitable material such as a tungsten carbide alloy. In this embodiment, it is made to have a rear portion 48 and a single tip portion 50 with a conical outer surface 52 extending centrally forward to a tip 54. It is made with a tapered melt bore 56 having a central rear portion 58 and a front portion 60 extending diagonally outward from the rear portion 58 to the outer conical surface 52.

Next, the electrical heating element 32 is wound in the spiral groove 34 in the outer surface 22 of the inner portion 12. The inner portion 12 is then inserted through the outer collar portion 20 with the head 24 of the inner portion 12 abutting against the circular inner flange 28 of the outer collar portion 20 and the terminal portions 36 of the heating element 32 extending out through the slot 42 in the outer collar portion 20. The locating and sealing ring stopper sleeve 62 is mounted around the inner portion 12 and tack welded in place adjacent the front end 16 of the inner portion 12. The two terminal portions 36 of the heating element 32 are inserted through the two holes 38 and the terminal locating and sealing key 40 is pushed inwardly to its assembled position in the matching slot 42 in the outer collar portion 20 with the pin portion 66 received in a hole 74 in the inner portion 12. Then, with the assembled components in the upright position shown in FIG. 4, a quantity of a first conductive brazing material having a suitable melting temperature such as a nickel alloy powder 76 is poured into the space 78 between the cylindrical outer surface 22 of the inner portion 12 and the skirt 30 of the outer collar portion 20. A bead 79 of the first conductive brazing material such as a nickel alloy paste 79 is applied at the front end 16 of the inner portion 12 adjacent the locating and sealing ring stopper sleeve 62.

Figure 5:
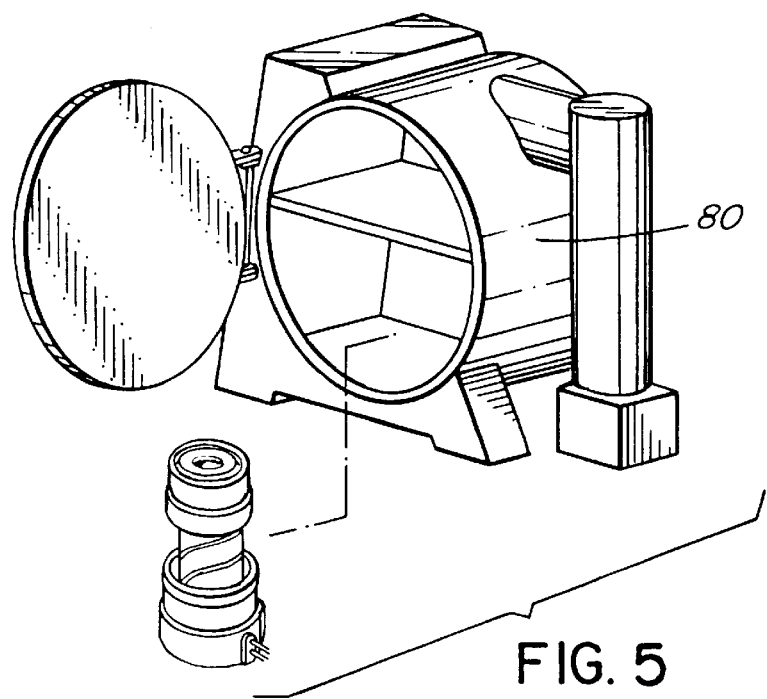
FIG. 5 is a schematic view showing the assembly from FIG. 4 in position to be inserted into a vacuum furnace.

The assembled components are then loaded (usually in batches) into a vacuum furnace 80 as seen in FIG. 5. As the vacuum furnace 80 is gradually heated to a first temperature of approximately 1950° F. which is above the melting point of the first nickel alloy brazing material powder 76 and paste 79, it is evacuated to a relatively high vacuum to remove substantially all of the oxygen. The vacuum is then reduced by partially backfilling the vacuum furnace 80 with an inert gas such as argon or nitrogen to avoid sputtering. This melts the first nickel alloy brazing powder 76 which flows by capillary action upwardly along the heating element 32 in the spiral grooves 34 and also between the inner portion 12 and the outer collar portion 20. It also melts the first nickel alloy brazing paste 79 which flows by capillary action between the inner portion 12 and the locating and sealing ring stopper sleeve 62 to integrally braze them all together. Brazing them together like this in a partial vacuum produces a metallurgical bonding of the nickel alloy brazing material 76 between them which in turn provides improved heat transfer between them.

After cooling, the integral nozzles 10 are removed from the vacuum furnace 80 and a tip insert 44 is mounted in place with its rear portion 48 in the matching seat 46 at the front end 16 of the inner portion 12 of the nozzle 10. A second conductive brazing material 82 such as a silver alloy having a suitable melting temperature substantially below the melting temperature of the first brazing material 76 is then applied around the tip insert 44 and the nozzles 10 are again loaded in batches into the vacuum furnace 80. In other embodiments, copper or brass type alloys having a melting temperature substantially below the melting temperature of the first nickel alloy brazing material 70 can be used. The vacuum furnace 80 is then gradually heated to a second temperature of approximately 850° F. which is above the melting temperature of the second silver alloy brazing material 82 but below the melting point of the first conductive brazing material 76. As the vacuum furnace 80 is gradually heated it is again evacuated to a relatively high vacuum to remove substantially all of the oxygen. The vacuum is then reduced by partially backfilling the vacuum furnace 80 with an inert gas such as argon or nitrogen to avoid sputtering. This melts the second silver alloy brazing material 82 which runs between the tip insert 44 and the surrounding inner portion 12 of the nozzle 10 to integrally braze them together. Brazing them together like this in a partial vacuum produces a metallurgical bonding of the silver alloy brazing material 82 between them to provide an integral injection molding heated nozzle 10 having very improved thermal characteristics. However, in an alternate embodiment of the invention, the tip insert 44 can be integrally brazed in place (or removed) by heating the nozzle 10 to the second temperature of approximately 850° F. just using the integral heating element 32 without insertion into the vacuum furnace. While a silver alloy second brazing material 82 is used in this embodiment, in other embodiments a copper alloy or other suitable second brazing material 82 can be used. The silver alloy second brazing material 82 having a melting temperature substantially below the melting temperature of the nickel alloy first brazing material 76 allows the tip insert 44 to be integrally brazed in place without melting the nickel alloy first brazing material 76. Similarly, it allows the tip insert 44 to be removed for replacement by again heating the nozzle 10 to this same second temperature without affecting the metallurgical bond between the other components of the nozzle 10.

The integral heated injection molding nozzle 10 is then machined to give it the desired outer shape and finish.

In use, the integral heated injection molding nozzle 10 is attached to a melt distribution manifold mounted in a mold (not shown) and electrical power is applied to the heating element 32 to heat it to a predetermined operating temperature. Pressurized melt is applied to the melt distribution manifold from a molding machine (not shown) according to a predetermined injection cycle. The melt flows through the central melt bore 18 in the heated nozzle 10 and the aligned melt bore 56 in the tip insert 44 to a gate (not shown) leading to a cavity in the mold. After the cavities are filled and a suitable packing and cooling period has expired, the injection pressure is released and the melt conveying system is decompressed to avoid stringing through the open gates. The mold is then opened to eject the molded products. After ejection, the mold is closed and the cycle is repeated continuously with a cycle time dependent upon the size of the cavities and type of material being molded.

Reference is now made to FIG. 8 which shows another embodiment of the method of making a integral heated injection molding nozzle 10 having an integral tip insert 44. In this embodiment, the tip insert 44 is made with the tip portion 50 extending diagonally outward from the rear portion 58 and the melt bore 56 extending centrally therethrough. The remainder of the method is the same and need not be repeated.

Figure 9:
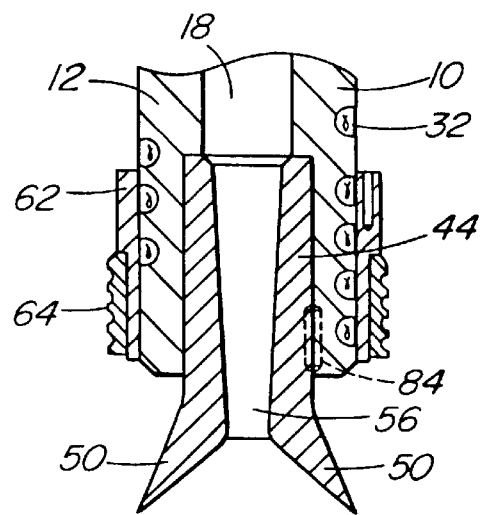
FIG. 9 is a sectional view showing a nozzle made according to another embodiment of the invention having a tip with a pair of angled tip portions.

Reference is now made to FIG. 9 which shows another embodiment of the method of making an integral heated injection molding nozzle 10 having an integral tip insert 44. In this embodiment, the tip insert 44 is made with a pair of tip portions 50 extending diagonally outward from the rear portion 48 and the melt bore 56 extending centrally therethrough. As can be seen, the tip portions 50 are made with a shape and size that allows the ribbed locating and sealing ring 64 to fit over them.

Figure 10:
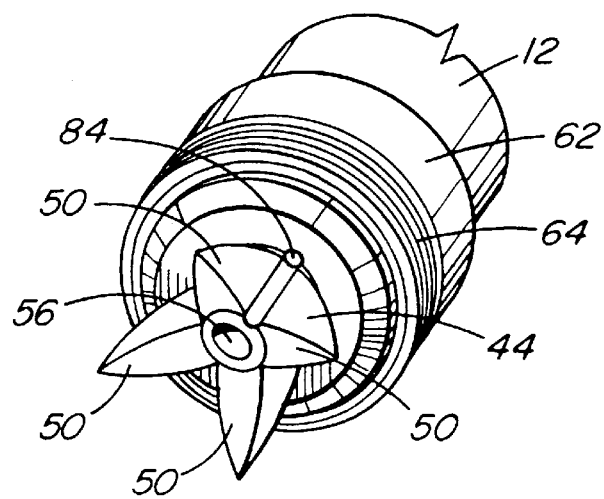
FIG. 10 is an isometric view showing a nozzle made according to a further embodiment of the invention having a tip with four angled tip portions.

Reference is now made to FIG. 10 which shows a further embodiment of the method of making an integral heated injection molding nozzle 10 having an integral tip insert 44. In this embodiment, the tip insert 44 is made with four tip portions 50 extending diagonally outward from the rear portion 48 and the melt bore 56 extending centrally therethrough. The nozzles 10 shown in FIGS. 8, 9 and 10, wherein the tip insert 44 has one or more tip portions 50 extending diagonally outward, all have a pin 84 extending between the tip insert 44 and the inner portion 12 of the nozzle 10 to locate the tip insert 44 relative to a reference bore 86 in the outer collar portion 20 shown in FIG. 1. This enables the nozzle 10 to be mounted with each tip 50 very accurately aligned in the center of the gate.

While the description of the method of making the integral heated injection molding nozzle 10 has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a method of making an integral heated injection molding nozzle comprising the steps of:

(a) making an elongated inner portion having a rear end, a front end, a melt bore extending therethrough from the rear end to the front end, and a general cylindrical outer surface with a spiral groove extending therearound, (b) making an outer collar portion to fit around the inner portion adjacent the rear end of the inner portion, the outer collar portion having a radial opening therethrough, (c) winding an electrical heating element into the spiral groove extending around the outer surface of the inner portion, mounting the outer collar portion in place around the inner portion with at least one terminal portion of the heating element extending outwardly through the radial opening through the outer collar portion, and closing in the radial opening around the at least one terminal portion, (d) applying a first brazing material having a predetermined melting temperature between the inner portion and the surrounding outer collar portion, (e) integrally brazing the inner portion, the outer collar portion, and the electrical heating element together by heating them in a substantially oxygen free atmosphere in a vacuum furnace to a temperature above the melting temperature of the first brazing material, and (f) machining the integral nozzle to provide a desired outer shape and finish, the improvement comprising the further steps of:

(g) making a seat extending around the melt bore at the front end of the inner portion of the nozzle, (h) making a tip insert having a rear end, a rear portion extending forwardly from the rear end, at least one tip portion extending forwardly from the rear portion, and a melt bore extending forwardly therethrough from the rear end, the rear portion being made to fit in the seat at the front end of the inner portion of the nozzle with the melt bore through the tip insert extending from the melt bore through the inner portion of the nozzle, (i) inserting the tip insert into the matching seat at the front end of the inner portion of the nozzle, (j) applying a second brazing material where the tip insert and the inner portion of the nozzle join, the second brazing material having a predetermined melting temperature substantially lower than the melting temperature of the first brazing material, and (k) integrally brazing the tip insert in place in the inner portion by heating them to a temperature above the melting temperature of the second brazing material and below the melting temperature of the first brazing material.

2. A method of making an integral heated injection molding nozzle as claimed in claim 1 wherein step (k) comprises heating in a substantially oxygen free atmosphere in a vacuum furnace.

3. A method of making an integral heated injection molding nozzle as claimed in claim 2 including making the seat around the melt bore at the front end of the inner portion of the nozzle cylindrical and also making the rear portion of the tip insert cylindrical to fit in said cylindrical seat.

4. A method of making an integral heated injection molding nozzle as claimed in claim 3 including making the cylindrical seat around the melt bore at the front end of the inner portion of the nozzle by machining.

5. A method of making an integral heated injection molding nozzle as claimed in claim 4 further including the step of:

(L) making a locating and sealing ring stopper sleeve having a cylindrical inner surface and a forwardly facing outer shoulder, the inner surface being made to fit over the front end of the inner portion of the nozzle, and (m) mounting the locating and sealing ring stopper sleeve on the inner portion of the nozzle with the sealing ring stopper sleeve adjacent the front end of the inner portion of the nozzle before step (e), whereby step (e) integrally brazes the locating and sealing ring stopper sleeve around the inner portion of the nozzle.

6. A method of making an integral heated injection molding nozzle as claimed in claim 5 wherein closing in the radial opening through the outer collar portion around the at least one terminal portion of the electrical heating element comprises making the outer collar portion with the radial opening therethrough being a slot and inserting into said slot a terminal locating and sealing key with at least one hole therethrough to receive the at least one terminal locating and sealing portion therethrough before step (d), whereby step (e) integrally brazes the terminal locating and sealing key in said slot.

7. A method of making an integral heated injection molding nozzle as claimed in claim 6 wherein the first brazing material is a nickel alloy.

8. A method of making an integral heated injection molding nozzle as claimed in claim 7 wherein the second brazing material is a silver alloy.

9. A method of making an integral heated injection molding nozzle as claimed in claim 8 including making the tip insert of a tungsten carbide alloy.

10. A method of making an integral heated injection molding nozzle as claimed in claim 4 wherein step (h) comprises making the tip insert with one tip portion having a conical outer surface extending centrally forward from the rear portion, with the melt bore extending therethrough having a central rear portion and a front portion extending diagonally outward from the central rear portion to the conical outer surface.

11. A method of making an integral heated injection molding nozzle as claimed in claim 4 including making a bore between the tip insert and the matching seat at the front end of the inner portion of the nozzle and inserting a locating pin into said bore to accurately orienting the tip insert relative to the inner portion of the nozzle to allow the tip portion of the nozzle to be accurately oriented with a gate.

12. A method of making an integral heated injection molding nozzle as claimed in claim 11 wherein step (h) comprises making the tip insert with one tip portion 50 having a conical outer surface extending diagonally outward from the rear portion, with the melt bore extending centrally therethrough.

13. A method of making an integral heated injection molding nozzle as claimed in claim 11 wherein step (h) comprises making the tip insert with a pair of tip portions having conical outer surfaces extending diagonally outward from the rear portion, with the melt bore extending centrally therethrough.

14. A method of making an integral heated injection molding nozzle as claimed in claim 11 wherein step (h) comprises making the tip insert with four tip portions having conical outer surfaces extending diagonally outward from the rear portion, with the melt bore extending centrally therethrough.

\* \* \* \* \*